United States Patent [19]

Peters et al.

[11] Patent Number: 4,531,528
[45] Date of Patent: Jul. 30, 1985

[54] CLEANING SHOE FOR A COMBINE

[75] Inventors: Loren W. Peters, Bettendorf, Iowa; Reed J. Turner, East Moline, Ill.

[73] Assignee: Deere & Company, Moline, Ill.

[21] Appl. No.: 472,506

[22] Filed: Mar. 7, 1983

[51] Int. Cl.³ .............................................. A01F 12/30
[52] U.S. Cl. ....................................... 130/24; 130/272
[58] Field of Search ............... 130/24, 26, 27 R, 27 T, 130/27 Z; 209/311, 312, 318; 56/14.6

[56] References Cited

U.S. PATENT DOCUMENTS

| | | | |
|---|---|---|---|
| 765,702 | 7/1904 | Davies | 130/26 |
| 1,190,471 | 7/1916 | Schuette | 130/24 |
| 1,962,541 | 6/1932 | Wickersham | 130/27 Z |
| 2,228,228 | 1/1941 | Ferguson | 209/318 |
| 2,303,249 | 11/1942 | Ashton et al. | 209/21 |
| 2,574,010 | 11/1951 | Bjorndahl | 130/24 |
| 3,334,739 | 8/1967 | Jarvis | 209/19 |
| 3,593,719 | 7/1971 | Ashton et al. | 130/21 |
| 4,314,571 | 2/1982 | DeBusscher et al. | 130/27.2 |
| 4,359,058 | 11/1982 | Rusanov et al. | 130/27 Z |

OTHER PUBLICATIONS

"Development of the MF Cascade Shoe", American Society of Agricultural Engineers, Paper No. 69-621.

Primary Examiner—Gene Mancene
Assistant Examiner—David I. Tarnoff

[57] ABSTRACT

In a cleaning shoe arrangement for a combine, an elongated grain pan includes a screen portion and receives crop material directly from an open threshing concave and a return pan under the straw walkers. The screen portion is provided with an under air blast and the grain pan thus does double duty—as a conveyor and as a precleaner or "conditioning sieve". Clean grain passing through this screen portion goes directly to the clean grain auger of the cleaning shoe. Remaining material, conditioned and stratified by its passage across the conditioning sieve of the grain pan, is delivered to a chaffer. Beneath the chaffer, a sieve assembly includes a conventional sieve portion and, extending downstream beyond the chaffer, a chaffer extension coplanar with the sieve portion and spaced from it by a transverse tailings slot, disposed above the tailings auger of the cleaning shoe. The chaffer and sieve assembly are provided with a conventional air blast from the cleaning shoe blower.

15 Claims, 3 Drawing Figures

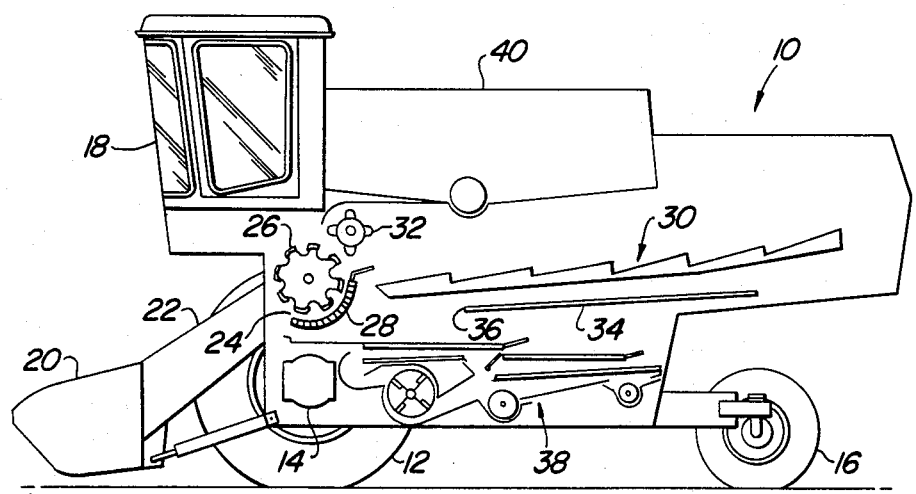
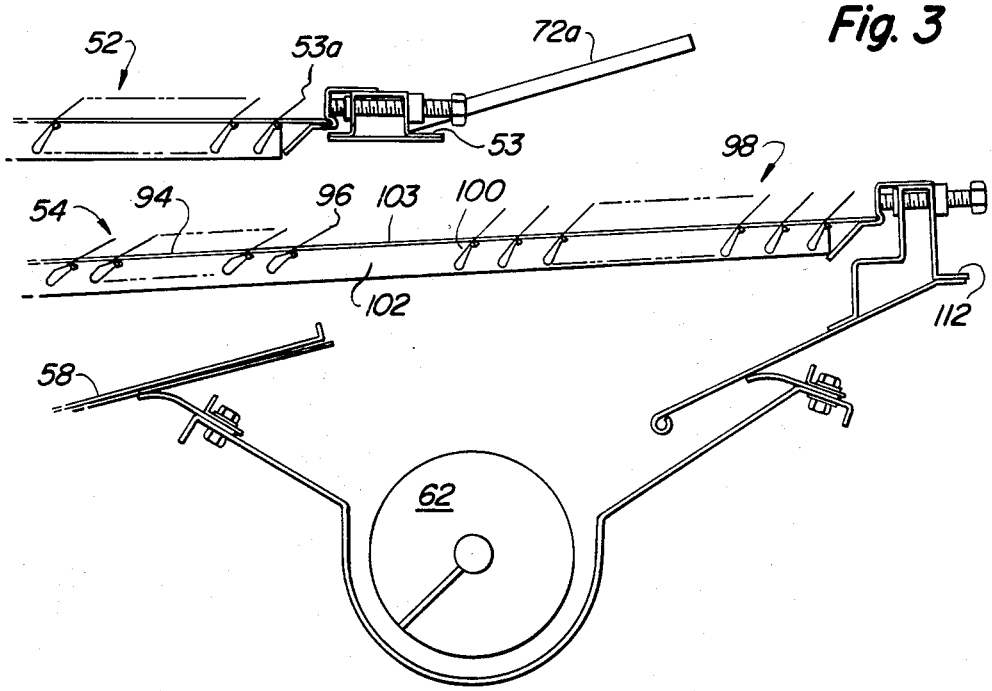

CLEANING SHOE FOR A COMBINE

BACKGROUND OF THE INVENTION

The present invention concerns that part of a combine harvester or threshing machine mechanism usually known as the cleaning shoe and whose function is to receive crop material from the threshing and separating sections of the machine and screen or sieve the material so as to isolatge clean grain for delivery to a grain tank or other receptacle.

The "conventional" cleaning shoe configuration is well known. Its basic elements are an upper screen (the chaffer), a lower screen (the sieve), a blower for delivering an air blast longitudinally and upwardly to the underside of the screens, means for delivering a flow of threshed and partially separated crop material to a forward part of the chaffer and means for oscillating or reciprocating the screens so that material on them migrates rearwardly. Clean grain passing downwards through both screens is collected and taken away by a clean grain conveyor. "Tailings", including unthreshed heads and some heavier, larger pieces of trash, intercepted by the sieve, fall from the rearward edge of the sieve and are taken away by a tailings conveyor for rethreshing. Lighter trash, including chaff, is discharged to the ground from the rear of the cleaning shoe by the air blast from the blower.

A major objective in combine design is to balance the capacity and efficiency of the principal components—those responsible for gathering, threshing, separating and cleaning. The wide range of crop type and operating conditions make this difficult. Moreover, cost considerations, transporting limitations and a need for good maneuverability make higher volumetric efficiencies for the vehicle as a whole very desirable. For a given nominal combine capacity, the overall dimensions of the machine must be minimized.

Combine capacity is typically expressed in terms of material flow for a given level of grain loss. The cleaning shoe is often a critical or limiting factor with its performance essentially establishing the effective capacity of the combine. Within the shoe itself, a balance must be maintained between the respective capacities of the chaffer and sieve, given that practical considerations lead them to be generally of similar dimensions and disposed one above the other. Within the shoe, the function of the chaffer (the upper screen) is perhaps most sensitive. In the conventional arrangement, the chaffer must deal with a largely undifferentiated heterogeneous mixture of grain, straw and chaff and other debris and, within its length, achieve a sorting of material so that a maximum of grain passes through to the sieve below and a minimum of grain is carried over the end of the chaffer. Unfortunately, among the wide range of types and conditions of crop material that a combine must handle, are many which tend to "overload the chaffer" by dumping onto it such a mat of material that throughput (rate of work) must be seriously reduced in order to keep grain losses within acceptable limits.

Many commercial combines still use the conventional shoe with little or no variation but the patent and other literature record many departures from the conventional, aimed at increasing volumetric efficiency. The essence of a number of these variations is to increase the effective chaffer surface area in relation to sieve area. The additional chaffer area is usually provided with an upwardly and rearwardly directed air supply, possibly ducted independently of the air supply to the main portion of the chaffer. However, typically, the potential for increased cleaner volumetric efficiency represented by more chaffer area is not realized because all material passing downwards from the chaffer portions is still delivered to a sieve which it has not been feasible to expand and which may thus become the "bottle neck" in the cleaning shoe.

In the variations referred to above attempts are made to provide additional screen area or make other modifications within the space of a given conventional combine configuration. Among the more promising of these is the conversion of the grain pan (usually extending forwardly of the shoe and above the cleaning shoe blower) from a simple conveying function to that of combined processing and conveying. A good example of this is disclosed by Ferguson in U.S. Pat. No. 2,228,228 but Ferguson also still delivers all material passing down from his extended chaffer to a single sieve screen of essentially conventional dimensions.

SUMMARY OF THE INVENTION

Accordingly, it is an object of this invention to improve still further the overall volumetric efficiency of the cleaning function within a harvester for grain crops and the like which combines the operations of threshing, separating and cleaning.

It is a further object of the invention to effect this improvement within the "envelope" or space defined by a particular combine configuration and to maximize the effect on shoe performance of modifications and additions by keeping the respective deliveries of material to the shoe from the threshing and separating mechanisms substantially discrete and by particular control of air and crop material movement within the cleaning shoe.

According to the invention, a precleaner element is added in a cleaning shoe arrangement which also includes a pair of vertically separated screens supplied with a rearwardly and upwardly directed air blast and means for handling material passing through and over the screens respectively. The precleaner element may comprise a generally horizontal screen shakeably mounted and disposed so as to receive crop material from tandemly disposed threshing and separating mechanisms of the combine and, by a screen action, divided that material into a first portion passing downwards through the screen to a shakeably mounted grain pan and a second portion migrating rearwardly over the screen for reception by the upper of the two regular screens. The precleaner screen portion is also provided with a rearwardly and upwardly directed air blast impinging on the underside of the screen. Preferably, the openings of the precleaner screen are adjustable and in normal operation, they are preferably adjusted so that essentially only grain passes through them downwards to the grain pan. The shaking action of the grain pan conveys material on its surface rearwardly to pass over its rearward edge and fall directly to a clean grain handling means for removal, for example, to a grain tank of the combine. The blower means for the regular screens of the shoe is preferably disposed generally beneath the precleaner element and the clean grain falling from the precleaner grain pan falls through its primary air blast so that light impurities are removed from the grain sample before it reaches the clean grain handling means.

The secondary air blast directed at the underside of the precleaner screen portion may be provided by means of a duct and air supply taken from the primary blower means.

It is a further feature of the invention to make a longitudinal differentiation with respect to the delivery of crop material to the screen portion of the precleaner. A forward section of this screen is reserved for reception and treatment of grain rich material emanating from the threshing means such as a cylinder and concave. As this material moves onto and across the first portion of the precleaner screen, the mechanical and aerodynamic action readily stratifies the material allowing relatively clean grain to pass downwards to the grain pan.

A second source of material for delivery to the precleaner screen is the combine separating means such as a bank of straw walkers and, more specifically, the flow of material from a forward delivery edge of a separator return conveyor arrangement such as a return pan. Preferably, this material is delivered to the precleaner screen at a point intermediate its upstream and downstream ends to join the residue of the material delivered from the threshing means. The second or downstream section of the precleaner screen therefore is presented with a mat or mix of material with a much higher percentage of material other than grain (MOG) and one in which grain migrates downwards much less readily. However, it is an advantage of the invention that within an essentially conventionally proportioned separator and cleaner arrangement, generous longitudinal space is available to provide a precleaning capacity which may match that of a conventional upper screen (chaffer) of a regular vertically spaced pair of screens immediately downstream of the precleaner screen.

The clean grain extracted in the precleaning process goes direct to the clean grain handling means so that the possibility of overloading and overtaxing the combined capacities of the regular vertically separated screens (such as an upper chaffer and a lower sieve) are significantly reduced.

It is a feature of the invention that the precleaner screen may be integral with and coplanar with or, as it were, inserted in what would otherwise be a conventional grain pan extending longitudinally from beneath the threshing means beyond the delivery point of a separator return pan, to terminate in a delivery edge disposed in a delivery relationship with a regular upper (chaffer) screen. Thus, at least a portion of the grain pan provides the dual functions of conveying and separation or cleaning. A grain pan may be provided closely beneath the screen portion of the precleaner and between it and the blower means while maintaining a vertically compact configuration. Preferably the planes of the precleaner screen and grain pan beneath it converge rearwardly so that in conjunction with sidewall portions of the cleaning shoe, or of the combine body itself, a converging plenum is created, helping to maintain the air velocity generated by the secondary air blast and passing through the precleaner screen at desirable levels over the longitudinal extent of the precleaner screen.

The action of the precleaner screen may be characterized in part as follows: the first section of the screen, dealing only with grain rich material from the threshing means and concave, serves largely as a sizing screen with grain kernels readily emerging from the mix and passing through the screen; the downstream portion of the screen, burdened with the bulky mix from the straw walkers, continues the sizing operation but, even though all remaining grain cannot possibly be removed at this stage, an important companion function of conditioning the crop material mat is performed. The combination of aerodynamic and mechanical agitation of the material on this downstream portion of the precleaner screen tends to fluidize the mat and progressively stratify it so that the demands on a regular chaffer and sieve, to which the material is delivered, are considerably lessened.

Preferably, a threshing, separating and cleaning combination according to the invention, also includes a rearward chaffer type extension of the lower screen or sieve of the regular vertically separated pair of screens. The chaffer extension is disposed above the means for collecting tailings from the cleaning shoe. Function in this area is enhanced by so spacing the forward edge of the chaffer extension from the rearward edge of the sieve proper as to create a transversely extending slot of sufficient longitudinal extent that tailings reaching the downstream edge of the main sieve portion may pass through the slot directly to the tailings collecting means. The configuration of the screen element is such that material may pass from the surface of the chaffer proper to the chaffer extension, rearwardly and below, without falling through this slot. An additional advantage of providing this gap or discontinuity in the lower screen, between its sieve and chaffer extension portions, is the elimination of the dam effect which may cause material buildup and blockage due to the change in screen character if the two portions are simply abutted.

BRIEF DESCRIPTION OF THE DRAWINGS

FIG. 1 is a left-hand side elevation, somewhat schematic and simplified, of a self-propelled combine harvester embodying the invention.

FIG. 3 is a further enlarged partial side view showing the downstream portions of the chaffer and sieve of the cleaning shoe.

DESCRIPTION OF THE PREFERRED EMBODIMENT

Figure 2:
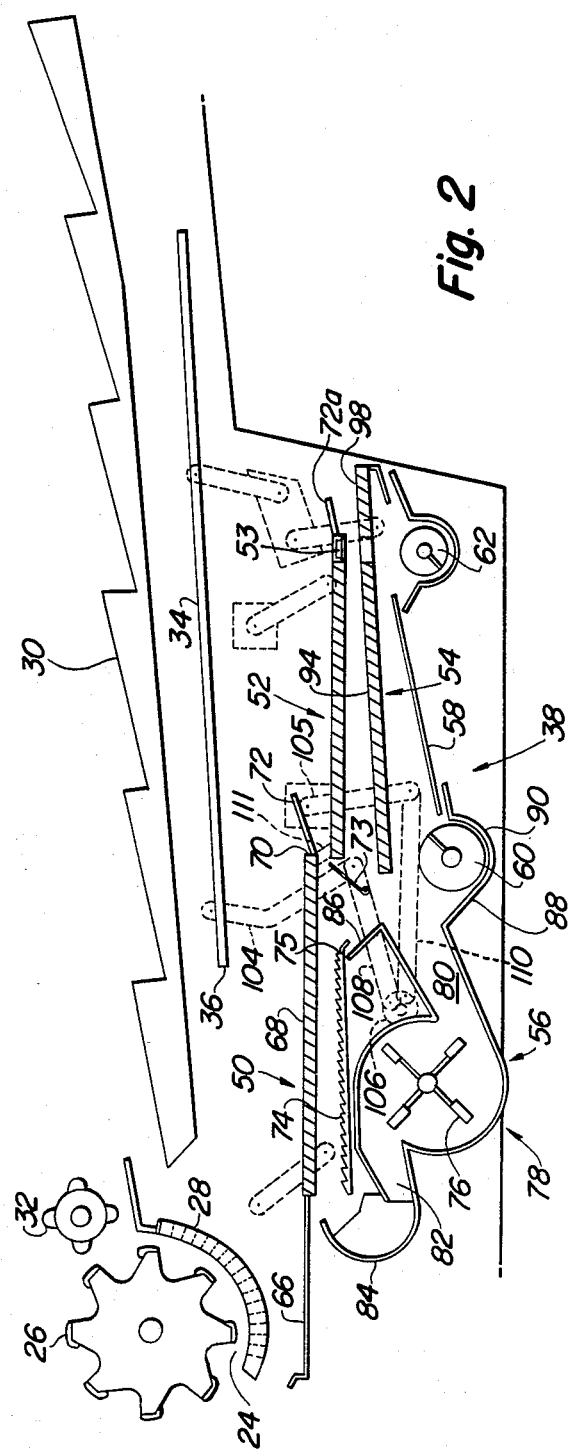
FIG. 2 is a schematic enlarged partial side elevation showing the arrangement of the principal functional components of the threshing, separating and cleaning portions of the combine.

The invention is embodied in the cleaning shoe and arrangements for feeding that shoe of an otherwise generally conventional self-propelled combine as shown in FIG. 1.

The combine body 10 is supported above the ground on forward drive wheels 12 (with drive axle 14) and rear steerable wheels 16. The machine is controlled from a forward operator station 18. In operation, a forward mounted gatherer 20 removes crop material from a field and converges it to a feeder house 22 for transfer to a threshing zone defined by conventional threshing cylinder 26, partially wrapped by an open concave 28. Discharge from the rear of the concave 28 is deflected rearwardly and downwardly onto conventional straw walkers 30 by a beater 32. Separated material passing downwards through the walkers is intercepted by a walker return pad 34 and carried forward for discharge over a forward discharge edge 36 of the return pan. Threshed and separated material passing downwards from the open concave 28 and return pan delivery edge 36 respectively, is received by a cleaning shoe 38 where clean grain is separated from chaff, broken straw, etc. and delivered to a grain tank 40 by conventional conveyors (not shown).

The functions performed by and the component arrangement of the cleaning shoe 38 are to some extent conventional (FIG. 2). A generally horizontal and planar receiving element 50, corresponding at least partially to the conventional grain pan, receives material from the threshing and separating sections and conveys at least a portion of it rearwardly to a chaffer 52 having a downstream discharge edge 53 and offset rearwardly and downwardly from the receiving element 50. A sieve 54 immediately below the chaffer 52 receives material passing downwards through the openings of the chaffer. A blower 56 mounted ahead of and somewhat below the chaffer 52 and sieve 54 provides a rearwardly and upwardly directed air blast to the underside of those elements to assist their screening operation. Clean grain passing downwards through the sieve 54 is intercepted by a forwardly and downwardly sloping floor 58 which delivers it to a clean grain auger 60. At least some of the material carried rearwardly by the chaffer 52 and the sieve 54 finds its way into the tailings auger 62.

Looking now at the cleaning shoe 38 in more detail and discussing particularly its unconventional aspects, we note that the receiving element 50 includes an impermeable forward portion 66 and generally coplanar with it, a foraminous sieve portion 68 having a rearward or downsteam delivery edge 70 from which extends a series of conventional fingers 72. A deflector 73 carried by the receiving element 50 extends laterally over its full width and extends downwardly and forwardly from adjacent the downstream edge 70 of the foraminous portion 68.

Closely spaced beneath and extending almost the full length of the sieve portion 68 of the receiving element 50 is a grain pan 74. Both the receiving element 50 and the grain pan 74 are approximately horizontal but preferably they converge slightly rearwardly as indicated in FIG. 2.

The wheel assembly 76 of the blower 56 is carried in a housing 78 having suitable outlets so that air may be delivered rearwardly and upwardly to the underside of the main chaffer and sieve 52 and 54, respectively, by a main duct 80 and also rearwardly and upwardly onto the underside of the sieve portion 68 of the receiving element 50 by means of a forwardly directed duct 82 cooperating with a deflector or scoop 84.

A transversely extending sheet metal deflector portion 86 is disposed so as to receive crop material passing over the rearward edge 75 of the grain pan 74. The deflector surfaces 86 and 73 cooperate to control the combined flow of grain from the grain pan 74 and the downstream section of sieve portion 68 so that it passes well forward of the main sieve assembly 54 and is released approximately vertically above a transversely extending downwardly and rearwardly sloping portion 88 of the trough 90 of the clean grain auger 60.

The main or forward portion of the sieve assembly 54 comprises a sieve portion 94 corresponding to the sieve of a conventional cleaning shoe and including a rear or discharge edge 96. Approximately coplanar with the sieve portion 94 but spaced rearwardly of it is a chaffer extension 98 having a forward transverse edge 100. This edge and the rear edge 96 of the sieve portion cooperate to define a transversely extending tailings slot 102 in the sieve assembly 54 and disposed approximately above the tailings auger 62. Both the sieve portion 94 and the chaffer extension portion 98 are carried by the same frame 103, seen best in FIG. 3.

As indicated in FIG. 2, all of the grain pan and sieve elements of the cleaning shoe 38 as well as the walker return pan 34 are suspended as is conventional on hangers such as the exemplary hangers 104, 105 shown. The elements are combined or coupled together into one or more subassemblies so that when connected to and driven by a simple powered crank 106 assembly through links 108 and 110, a generally horizontal reciprocating motion is imparted to the elements resulting in agitation of and propulsion in a rearward direction of crop material carried on them. For example, the receiving element 50 and chaffer 52 may be tied together by connecting link 111 so that they move as a unit.

Looking at the operation of the combine in more detail—forward motion of the machine in a field of crop gathers crop material and delivers it to the threshing zone 24 where threshing and separation begins. From the disposition of components shown in FIG. 2, it can be seen that the upstream portion of the sieve portion 68 of the receiving element 50 will receive primarily grain rich material from the concave 28. It is the nature of the conventional threshing cylinder and concave function that a relatively high proportion of the grain present in the crop mass will pass through the openings in the open concave (28) along with only a relatively small proportion of the chaff and other small particles. The bulk of the crop mass (straw, leaves, etc.) with the remaining grain is carried over onto the straw walkers.

The upstream portion of the sieve portion 68, receiving the grain rich material directly from the concave, or transferred from the pan portion 66, and with its openings suitably adjusted, immediately begins a very efficient sieving or sizing operation assisted by the mechanical agitation of the element and the aerodynamic effect of the air from the scoop and duct, 84 and 82 respectively, so that most of the grain in this material passes as clean grain downwards onto the grain pan 74.

Most of the material separated out in the straw walkers 30 passes downwards onto the walker return pan 34 and is delivered to the second or downstream portion of the sieve portion 68 by way of the discharge edge 36 of the return pan 34. This more bulky material contains a much higher percentage of pieces of straw, chaff and other debris and relatively less grain. The operation of the precleaner receiving element (50) thereforeon this material in the second half of the sieve portion 68 also includes sizing so that an additional fraction of clean grain passes down onto the grain pan 74 but at the same time the mechanical and aerodynamic effects on the mat of material may be termed a conditioning or stratification in which heavier fractions of the material, including grain, migrate into its lower layers. The element 50 may therefore be appropriately and conveniently referred to as a conditioning sieve although, of course, it contributes an important sizing and conveying function also. The conditioning sieve portion 68 does anticipate part of the normal function of the sieve of the conventional shoe but it may be distinguished from the regular sieve in important respects. Among other things, it receives two different mixes of material (from threshing and separating sections respectively) and, preferably, it is given a shaking motion similar to that of a chaffer, i.e., more aggressive than a conventional sieve. (In this respect, especially if they are coupled together as suggested above, the receiving element 50 and chaffer 52 may be considered to comprise an elongated chaffer assembly with an offset and air gap between upstream and downsteam sections.) Fingers 72 help to maintain the stratification effected by the conditioning sieve as the material is transferred from the sieve portion 68 over its rearward discharge edge 70 to the chaffer 52.

The reciprocating action of grain pan 74 carries the clean grain it has intercepted rearwards for discharge over its rearward edge 75 to fall downwards, deflected in part by deflector 86. More clean grain from the downstream section of sieve portion 68, in part deflected by deflector 73, joins the grain from the pan 74 and the combined flow is in effect funneled downwards for release into the primary air blast from the blower main duct 80 on its way to the clean grain auger 60. The air blast has the effect of removing remaining chaff and other small particles from this first portion of the grain sample. As can be seen in FIG. 2, this flow of material enters the air stream approximately on a level with the main sieve assembly 54 and sufficiently far forward of its upstream edge to minimize the possibility of portions of this first portion of the clean grain sample being carried onto the surface of the sieve portion 94. Such a "carry over" would of course, at least in part, nullify the advantages of the invention. In keeping with the invention it is preferred that, as in the present embodiment, the cleaning shoe elements are configured so that portions of the first clean grain fraction passing downwards from the sieve portion 68 to the clean grain conveyor 60 are not inadvertently carried onto the main sieve portion 94.

The operation of the chaffer 52 and sieve portion 94 beneath it are conventional and result in a delivery of clean grain by way of the return floor 58 to the clean grain auger 60 and of tailings and other material over the dwonstream edge 53 of the chaffer 52.

Looking now at the arrangement of the downstream portions of the chaffer 52 and the sieve assembly 54 and referring to FIG. 3, it is seen that the arrangement departs from the conventional in that the rearward or downstream edges 53a and 96 of the louvered portions of chaffer 52 and the sieve portion 94 respectively, are in approximate vertical alignment. The chaffer extension portion (98) of the conventional chaffer has as it were, been removed downward and rearwardly into the plane of the sieve portion 94, and disposed so as to leave the transverse tailings slot 102. Conventional fingers 72a extend from the downstream edge 53 of the chaffer 52. Any tailings material (unthreased heads, etc.) which has not passed through the relatively coarse openings of the chaffer 52 and hence has been carried to the delivery edge 53 of the chaffer will pass rearwardly and downwardly onto the chaffer extension 98 and be subjected to the conventional chaffer extension operation. Provision of the tailings slot 102 between the sieve portion 94 and chaffer extension 98 permits an essentially conventional operation or function of the sieve portion 94 with tailings passing over its downstream edge 96 directly into the tailings auger 62. The fitting of fingers 72a to the chaffer 52 is optional according to crop or crop conditions.

The potential for increased volumetric efficiency of a cleaning shoe according to the invention and its contribution to the volumetric efficiency of the combine separator body as a whole are apparent from the drawings as well as the above description. The departures from the conventional cleaning shoe arrangements are independent of the width of the shoe and may be made without increasing the length of a given installation. The increase in volumetric efficiency comes from increasing the total working screen area and an arrangement in which an early highly efficient sizing and segregation of a substantial portion of the clean grain takes place. The loading of the remainder of the system is then significantly reduced both by having reduced the total volume of material which must be dealt with and by the conditioning and stratification effect which takes place particularly in the second half of the so-called conditioning sieve. This conditioning of the mat effectively increases the capacity of the chaffer proper in that virtually its full length becomes available for its normal coarse sizing operation.

Advantages of the invention, including improved volumetric efficiency, result in part from recognition of the possibilities of substantially segregating the respective deliveries of crop material from the threshing concave and from the separator to an elongated grain pan and by making that grain pan do double duty as a conveyor and processor by inserting into it a screen area. This segregated delivery combined with appropriate control of the apertures in the screen portion make possible a single-stage cleaning with no secondary sieve beneath. Thus the conditioning sieve may more easily be accommodated in existing vertical space.

An additional advantage results from removing the chaffer extension portion of the chaffer down to the sieve level and spacing it rearwardly from the sieve. Adjusting levers (not shown) for the sieve louver openings, generally close to the downstream edge of the conventional sieve and normally "hidden" under the chaffer extension, may be located at the rear edge 112 of the sieve assembly 54 and thus become more accessible.

The present embodiment of the invention is a so-called conventional combine. It will be appreciated that it is adaptable to other combines, (such as axial flow rotaries) of the type in which the cleaning shoe underlies a crop processing mechanism with an upstream threshing portion and downstream separating portion, tandemly and axially arranged.

We claim:

1. In a combine for harvesting and processing crop material, having threshing and separating portions and a longitudinally extending cleaning shoe comprising at least two foraminous screens including a first foraminous screen for receiving a flow of crop material from the threshing and separating portions of the combine and passing a first portion of it downwards through its foramina and a second portion of material rearwards over the rearward edge of the screen and a second foraminous screen beneath the first for receiving at least some of the first portion of crop material and separating it so that a third portion passes downwards through foramina of the second screen for delivery to a clean grain conveyor, characterized in that the first screen includes an upstream portion for receiving the crop material from the threshing and separating means and a downstream portion offset vertically downwards and the upstream portion has a delivery edge disposed above a receiving portion of the downstream screen portion;

the second screen substantially underlies the downstream portion of the first screen;

a pan means beneath the upstream screen portion for receiving material passing downwards through that screen portion, the pan being disposed and agitated so that material received is conveyed rearwardly over a downstream edge, bypassing the upstream edge of the second screen for direct delivery to the clean grain conveyor; and in having blower means for directing first and second air blasts respectively rearwardly and upwardly towards the undersides of the upstream and downstream portions of the first screen.

2. The cleaning shoe of claim 1 further characterized in that the blower means is disposed so that the crop material delivered by the pan means passes through the second blast.

3. A combine having:

crop processing means for receiving gathered crop material and delivering threshed and separated crop material;

a longitudinally extending cleaning shoe including a first grain pan having a downstream edge, and disposed so as to receive the threshed and separated material and discharge at least some of it from the downstream edge;

at least one first foraminous element having a downstream edge, for receiving crop material from the first grain pan;

means for agitating the at least one first foraminous element so that a separating action occurs, a first fraction of crop material passing downward through the foramina of the at least one element and a second fraction of material being conveyed downstream by the element and discharged at its downstream edge;

blower means for directing a first air blast towards the at least one first foraminous element to facilitate the separating action;

means for collecting the first fraction of material; and means for collecting at least a portion of the second fraction of material;

characterized in that the first grain pan has at least one foraminous area having a downstream end so that a predetermined third portion of the crop material may pass downward through the foraminous area and the shoe includes a second grain pan disposed under the at least one foraminous area of the first grain pan for intercepting at least a fraction of the third portion of crop material;

the shoe includes means for agitating the second grain pan so that material on it is conveyed rearwardly downstream and discharged as a flow of material over a downstream edge of the second grain pan;

the means for collecting the first fraction of material is in a direct crop material receiving relationship with the flow of material from the second grain pan; and the blower means includes means for directing a second air blast rearwardly and upwardly to engage the underside of the foraminous area of the first grain pan.

4. The combine of claim 3 further characterized in that the air blast means is disposed so that the flow of material from the second grain pan passes through the first air blast.

5. The combine of claim 4 further characterized in that the shoe includes a second foraminous element disposed beneath the at least one first element and having an upstream edge, and crop material deflecting means below the downstream end of the at least one foraminous area of the first grain pan for controlling the flow of material passing downwards from the at least one foraminous area so that it is released into the first air blast at a level not higher than approximately the level of the surface of the second foraminous element and spaced upstream from the upstream edge of the second foraminous element.

6. The combine of claim 3 further characterized in that the at least one first foraminous element is a chaffer having a first screening characteristic and in including a sieve having a downstream edge a second screening characteristic and substantially underlying the chaffer disposed to intercept at least a portion of the first fraction and a chaffer extension, generally coplanar with the sieve, extending rearwardly of the rearward edge of the sieve and having a screening characteristic similar to that of the chaffer.

7. The combine of claim 6 further characterized in that the forward edge of the chaffer extension is spaced rearwardly from the downstream edge of the sieve so as to define a transversely extending tailings slot spanning the sieve and wherein a portion of the first fraction of crop material is carried by the sieve to the downstream edge of the sieve and the width of the slot, measured longitudinally, is sufficient to permit the downward passage of said portion of the first fraction of crop material.

8. The combine of claim 3 further characterized in that the first grain pan includes an impermeable area upstream of the foraminous area.

9. The combine of claim 3 further characterized in that the first and second grain pans are both substantially planar and horizontal and that their planes converge rearwardly.

10. The combine of claim 3 further characterized in that the means for delivering threshed and separated crop material includes material control means for delivering the threshed material towards a first upstream portion of the first grain pan and the separated material towards a second area of the first grain pan, generally downstream of the first.

11. In a combine for harvesting and processing grain bearing crop material, having threshing and separating portions for processing the material, and a longitudinally extending cleaning shoe for receiving a grain bearing portion of crop material from the threshing and separating portions of the combine and further processing that material and delivering a clean grain fraction and a tailings fraction and discharging a third fraction rearwardly from the combine comprising:

a first screen portion for receiving the crop material from the threshing and separating portions of the combine;

a second screen portion offset rearwardly and downwardly from the first portion and having an upstream portion in a crop material receiving relationship with the downstream edge of the first portion;

blower means underlying the first screen portion and including first and second ducted outlets for delivering respectively, air blasts rearwardly and upwardly towards the underside of the first and second screen portions;

a grain pan disposed between the blower means and the first screen portion for receiving material passing downwards through the first screen portion and having a rearward delivery edge;

a clean grain conveyor disposed below and in a substantially direct material-receiving relationship with the delivery edge of the grain pan; and means for agitating the screen portions and the grain pan so that crop material received by the first screen portion is conveyed downstream and material received by the grain pan passes over its rearward edge for delivery to the clean grain conveyor.

12. The cleaning shoe of claim 11 wherein one of the air blasts passes rearwardly and upwardly between the first screen portion and the clean grain conveyor and further including crop material deflector means disposed beneath the first screen portion towards its downstream end for deflecting forward at least a portion of the crop material passing downwards through it before releasing it into the air blast.

13. A cleaning shoe for fore-and-aft disposition in a combine, having a chaffer screen for receiving threshed and separated material including chaff, tailings and grain and, disposed below it, a sieve screen and a clean grain conveyor disposed below and towards the upstream edges of the screens and a tailings conveyor disposed below and towards the rearward edges of the screens and a blower for directing an air blast rearwardly and upwardly towards the underside of the screens and means for agitating the screens so that chaff is carried rearwardly on the chaffer screen and tailings and grain pass through the chaffer screen onto the sieve screen, and tailings are carried rearwardly on the sieve screen for discharge at the rearward edge of the sieve screen and grain passes through the sieve screen to the clean grain conveyor characterized in that:

the sieve screen is associated with a chaffer screen extension, substantially coplanar with the sieve screen and having an upstream edge spaced downstream of the rearward edge of the sieve screen so as to define a transversely extending tailings slot spanning the sieve screen, for downward passage of the tailings and disposed so that tailings passing through said slot are delivered to the tailings conveyor.

14. The cleaning shoe of claim 13 further characterized in that the tailings slot is disposed approximately vertically below the downstream edge of the chaffer screen.

15. The cleaning shoe of claim 13 further characterized in that the chaffer carries, extending rearwardly from its rearward edge, a plurality of crop separating fingers extending rearwardly over the chaffer extension.

* * * * *